(No Model.)
L. S. BACHE.
SPLIT PULLEY.
No. 513,359. Patented Jan. 23, 1894.
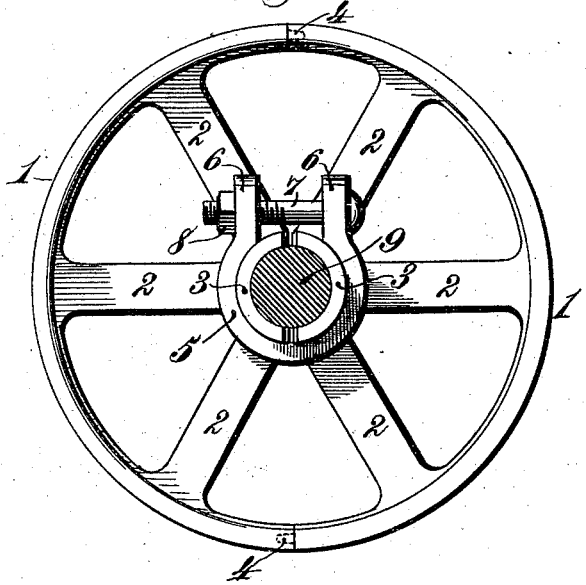
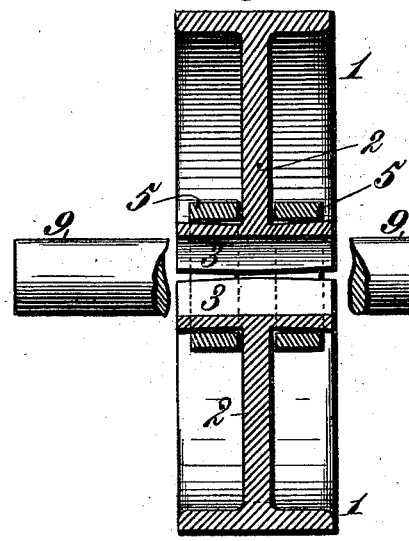
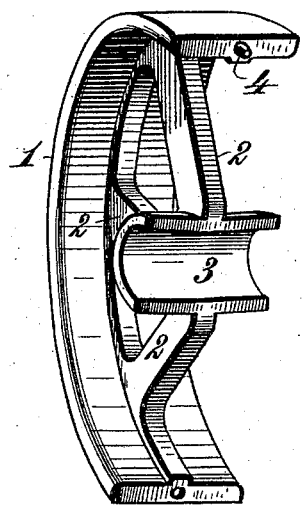
Witnesses.
Robert Curutt
Damie Sumby
Inventor.
Leigh S. Bache
By
James L. Norris.
Atty

UNITED STATES PATENT OFFICE.

LEIGH S. BACHE, OF BOUND BROOK, NEW JERSEY.

SPLIT PULLEY.

SPECIFICATION forming part of Letters Patent No. 513,359, dated January 23, 1894.

Application filed October 27, 1893. Serial No. 489,288. (No model.)

*To all whom it may concern:*

Be it known that I, LEIGH S. BACHE, a citizen of the United States, residing at Bound Brook, in the county of Somerset and State of New Jersey, have invented new and useful Improvements in Split Pulleys, of which the following is a specification.

My invention relates to certain improvements in the construction of split pulleys, or other wheels, the purpose thereof being to simplify and reduce the number of parts and to provide a wheel of this type, which may be used either as a fast, or as a loose wheel, and be capable of being easily and quickly changed from one to the other.

The invention consists in the novel features of construction and in the several parts and new combinations of parts hereinafter fully explained and then particularly pointed out and defined in the claim which follows this specification.

To enable those skilled in the art to which my invention pertains to fully understand and to make, construct and use the same, I will now describe said invention in detail, reference being had, for this purpose, to the accompanying drawings, in which—

Figure 1, is a side elevation of a pulley constructed in accordance with my invention. Fig. 2, is a section of the same taken in the axial line of the shaft. Fig. 3, is a detail view showing the construction of the hub of the pulley.

In the said drawings the reference-numeral 1 indicates either one of the two equal parts, or members of the pulley, each being composed of a semi-circular portion provided with spokes 2, which are united integrally with the half-section 3 of the hub. Each half section is dressed off externally to form an approximately true semi-cylinder, the external diameter being slightly decreased from the outer end of the hub toward the spokes for a purpose presently to be explained. The pulley is split, or divided, in a diametrical line, or substantially so, and in the abutting edges of its periphery are set dowel pins 4, which engage with suitable apertures in the corresponding portions of the other half of the pulley, thereby affording guides by which the accurate relative adjustment of the parts, or sections of the pulley, may be effected when said parts, or sections are united.

Upon the split or divided sections of the hub, upon each side of the spokes 2, is mounted a yoke-shaped clamp 5, formed of a single piece of metal with substantially parallel arms or end portions 6 which are of somewhat greater thickness than the curved portion which surrounds the hub, in order to increase the area of frictional contact. Through the ends 6 of each clamp is passed a bolt 7, upon the threaded end of which is turned a nut 8. By screwing the latter up with a wrench the clamp may be compressed upon the sections of the divided hub, thereby locking the latter to the shaft 9 with any desired force. The inwardly diminished, or tapered diameter of the hub, though very small in degree, is sufficient, nevertheless, to effect the permanent retention of the clamps 5 in operative engagement therewith, since the compression of the same upon the hub tends to draw said clamps toward the spokes and thus cause them to retain their proper relative position under all circumstances. The half-sections 3 of the hub are separated by a diametrical cut, and the opposite, or adjacent edges of said half-sections are dressed off in such manner as to cause said edges to have a slight divergence from the center to the outer ends of the hub, as shown in Fig. 2. This construction provides for a slight yielding of the divided hub-sections at their ends, thereby clamping the same upon the shaft, the maximum clamping pressure thus produced being directly in the same vertical plane with the clamp producing it. By merely tightening or loosening the nuts 8, on the bolts 7, the pulley may be made fast, or loose, upon the shaft 9, and by slightly turning up said nuts, from time to time, the wear to which the parts are subjected by long continued use may be fully compensated.

The construction is extremely simple, the number of parts is reduced to the minimum and great strength and durability are provided by my invention. Moreover, the pulley may be adjusted upon the shaft, removed therefrom, applied to a different shaft, and converted from a fast to a loose pulley, or vice versa, with the least possible expenditure of labor and time.

I have illustrated my invention in the drawings as applied to a pulley, but I wish it understood that the invention is applicable to sprocket, gear and other wheels.

What I claim is—

A split pulley or wheel composed of two similar half sections 1 formed with divided hub sections 3 extending from opposite sides thereof and having plain smooth peripheries tapering from their outer ends toward the center, the yoke-shaped clamps 5 fitted directly upon the said plain smooth tapering peripheries of the hub sections, and each composed of a single piece of metal curved to fit the hub sections and having substantially parallel arms 6, and clamping bolts 7 respectively connecting the two arms of each yoke-shaped clamp to rigidly clamp the opposite ends of the tapering hub-sections on a shaft extending through the same, said tapering hub sections by direct engagement with the clamps retaining the latter from lateral displacement, substantially as described.

In testimony whereof I have hereunto set my hand and affixed my seal in presence of two subscribing witnesses.

LEIGH S. BACHE. [L. S.]

Witnesses:
J. E. RUTT,
A. H. DAYTON.